UNITED STATES PATENT OFFICE.

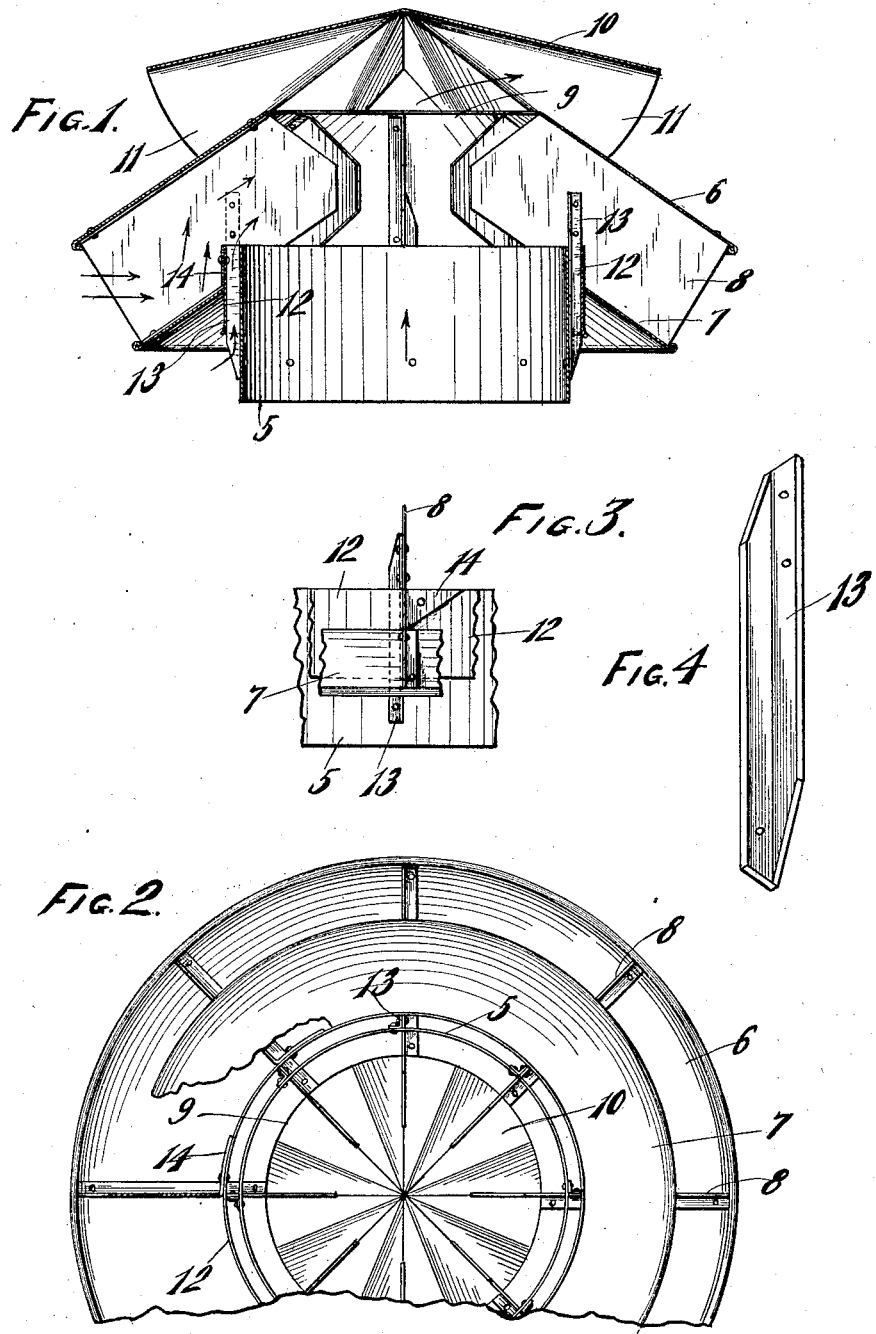

ROBERT T. MERRILL, OF MILWAUKEE, WISCONSIN.

VENTILATOR AND CHIMNEY-CAP.

1,037,286.  Specification of Letters Patent.  Patented Sept. 3, 1912.

Application filed November 24, 1911. Serial No. 662,205.

*To all whom it may concern:*

Be it known that I, ROBERT T. MERRILL, a citizen of the United States, and resident of Milwaukee, in the county of Milwaukee and State of Wisconsin, have invented new and useful Improvements in Ventilators and Chimney-Caps, of which the following is a description, reference being had to the accompanying drawings, which are a part of this specification.

This invention relates to ventilators and chimney caps or the like, and has for its object to improve upon the construction covered by my United States Patent No. 915,871 for chimney caps and ventilators, dated March 23, 1909, by providing the same with a short collar spaced from the draft tube or pipe to permit of a current of air passing between them and into the head of the device to produce an inductive action upon the air or gas within the draft tube or pipe and thus facilitate the production of a draft within the draft tube or pipe.

Another object of the invention is to improve upon details of construction of such devices whereby they may be readily assembled and strong and durable in use.

With the above and other objects in view, the invention consists of the ventilator and chimney cap as herein claimed, and all equivalents thereof.

Referring to the accompanying drawing in which like characters of reference indicate the same parts in different views: Figure 1 is a sectional elevation of a ventilator and chimney cap constructed in accordance with this invention; Fig. 2 is a plan view of the same inverted, a portion being broken away; Fig. 3 is a detail view of a portion thereof, the upper conical deflector and cap being removed; and Fig. 4 is a perspective view of one of the spacing strips.

In these drawings 5 indicates a draft tube or pipe which may be connected to a chimney top or ventilator tube in the ordinary way. An upper conical deflector 6 and a lower conical deflector 7 are mounted on the draft tube 5 with vertical radial ribs or partitions 8 between them and the manner of mounting these deflectors on the draft tube 5 constitutes the novel feature of this invention. As before, the upper conical deflector 6 is provided with a central opening 9 of slightly smaller diameter than the opening in the draft tube 5 and is surmounted by a cap 10 bent to form alternate radial ridges, and the portions of the cap between the ridges form a series of upwardly leading radial air passages 11. The inner free portions of the radial ribs or partitions 8 extend inwardly to a point near the vertical center of the device so as to converge and guide the air currents for a sufficient distance across the opening in the draft tube to improve the draft of said tube and prevent air eddies forming above the draft tube which would retard the draft in the tube. This construction operates as with the former construction referred to, the air entering between the conical deflectors being utilized to induce an updraft in the draft tube, but in the present construction provision is made for also utilizing the air currents which strike the draft tube below the lower conical deflector. To this end the lower conical deflector 7, instead of being connected directly to the draft tube 5 as before, is now secured to a short collar 12 of somewhat larger diameter than the draft tube to afford a space between them and this space is maintained by spacing strips 13, which may be of sheet metal bent to the angular form clearly shown in Fig. 4. These strips are arranged in a vertical position and are riveted or otherwise secured to the draft tube 5 at one flange thereof at their lower ends, and are likewise riveted on their other flanges at their upper ends to the ribs or partitions 8. The ribs or partitions 8 are notched at their lower edges as before, but now the notch extends a sufficient distance to receive the collar 12, and the flaps 14, formed by cutting these notches, are bent to lie against the outside of the collar 12 and are riveted thereto. As the ribs or partitions 8 are secured to the conical deflectors 6 and 7 by having their edges turned over to form flanges which are riveted to said conical deflectors as before, it will be seen that the spacing strips 13, by being riveted to the ribs or partitions 8 at their upper ends, and to the draft tube 5 at their lower ends, constitute the connecting means between the upper portion of the device and the draft tube, the collar 12 having its connection with the ribs or partitions by means of the flaps 14 riveted thereto.

In operation the air currents which strike the draft tube 5 below the lower conical deflector 7 are given an upward tendency after passing the lower edge of said conical deflector 7, so that they are deflected upwardly by striking the draft tube and are conveyed through the space between the draft tube and collar 12 and add their force to the air currents entering between the conical deflectors so as to increase the inductive action upon the air or gas within the draft tube and render material assistance in producing a stronger draft therethrough. To avoid unnecessary obstruction to the passage of air the lower flange of each spacing strip 13 which is not riveted to the draft tube is cut away at an incline, as shown, and the upper edge of the other flange is likewise cut away.

The advantages for the new feature of the device, as above pointed out, are marked in practice and the simplicity of the construction makes it easy to assemble in the manufacture and of a strong durable character for long continued use.

What I claim as my invention and desire to secure by Letters Patent is,

1. A ventilator and chimney cap, comprising a draft tube, vertical spacing strips angular in cross section having one face secured to the outside wall of the draft tube, a collar surrounding the draft tube, vertical radial ribs or partitions secured to the other faces of the spacing strips and secured to the collar, a conical deflector beneath the radial ribs or partitions and surrounding the collar, a second conical deflector thereabove secured to the radial ribs or partitions and provided with a central opening, and a cap on the second conical deflector above the opening thereof.

2. A ventilator and chimney cap, comprising a draft tube, vertical angular spacing strips secured to the outside of the draft tube, a short collar surrounding the draft tube and spaced therefrom by the spacing strips, vertical radial ribs or partitions secured to the spacing strips and having flaps cut therefrom secured to the collar, a conical deflector mounted on the radial ribs or partitions and surrounding the collar, a second conical deflector thereabove secured to the radial ribs or partitions and provided with a central opening, and a cap mounted on the second conical deflector above the opening thereof.

In testimony whereof, I affix my signature, in presence of two witnesses.

ROBERT T. MERRILL.

Witnesses:
R. S. C. CALDWELL,
KATHERINE HOLT.

Copies of this patent may be obtained for five cents each, by addressing the "Commissioner of Patents, Washington, D. C."